(12) United States Patent  
Cardoletti et al.

(10) Patent No.: US 8,531,145 B2
(45) Date of Patent: Sep. 10, 2013

(54) SENSORLESS TECHNOLOGY, ESTIMATION OF SAMPLED BACK EMF VOLTAGE VALUES AND/OR THE SAMPLED INDUCTANCE VALUES BASED ON THE PULSE WIDTH MODULATION PERIODS

(75) Inventors: Laurent Cardoletti, Villeneuve (CH); Thierry Bieler, Echichens (CH); Christain Koechli, Yvonand (CH); Christian Fleury, Bellerive (CH)

(73) Assignee: Micro-Beam SA, Neuchatel (CH)

( * ) Notice: Subject to any disclaimer, the term of this patent is extended or adjusted under 35 U.S.C. 154(b) by 900 days.

(21) Appl. No.: 12/307,308

(22) PCT Filed: Jul. 4, 2007

(86) PCT No.: PCT/EP2007/056706
§ 371 (c)(1),
(2), (4) Date: Jan. 2, 2009

(87) PCT Pub. No.: WO2008/003709
PCT Pub. Date: Jan. 10, 2008

(65) Prior Publication Data
US 2010/0001673 A1    Jan. 7, 2010

(51) Int. Cl.
*H02P 6/18*      (2006.01)
(52) U.S. Cl.
USPC ............... 318/400.34; 318/400.27; 318/811
(58) Field of Classification Search
USPC ............... 318/400.34, 400.27, 811
See application file for complete search history.

(56) References Cited

U.S. PATENT DOCUMENTS

| 5,793,179 | A | 8/1998 | Watkins |
| 7,183,734 | B2* | 2/2007 | Lassen .................. 318/400.34 |
| 2008/0224639 | A1* | 9/2008 | Balsiger .................. 318/254.1 |

FOREIGN PATENT DOCUMENTS

EP     0 780 966     6/1997

OTHER PUBLICATIONS

Satoshi Ogasawara et al., "An Approach to Real-Time Position Estimation at Zero and Low Speed for a PM Motor Based on Saliency", IEEE Transactions o Industry Applications, IEEE Service Center, vol. 34, No. 1, Feb. 1998, XP011022335, pp. 163-167.
Paul P. Acarnley et al., "Detection of Rotor Position in Stepping and Switched Motors by Monitoring of Current Waveforms", IEEE Transaction on Industrial Electronics, IEEE Service Center, vol. 32, No. 3, Aug. 1, 1985, XP000573294, pp. 215-222.
S.K. Panda et al., "Switched Reluctance Motor Drive Without Direct Rotor Position Sensing", Conference Record of the Industry Applications Society Annual Meeting, Seattle, Oct. 7-12, 1990 New York, IEEE, US, vol. 2, Meeting 25, Oct. 7, 1990, XP010034819, pp. 526-530.
International Search Report dated Nov. 27, 2007, from corresponding PCT application.

* cited by examiner

*Primary Examiner* — Erick Glass
(74) *Attorney, Agent, or Firm* — Young & Thompson (57) ABSTRACT

The methods and devices provided herein include methods and devices for controlling a permanent magnet motor. In one implementation, a method is provided that allows for the determination of the values of the phase back EMF voltage and of the phase inductances while the phases are powered with a PWM (Pulse Width Modulation) controlled current and/or voltage.

43 Claims, 9 Drawing Sheets

Fig.8

SENSORLESS TECHNOLOGY, ESTIMATION OF SAMPLED BACK EMF VOLTAGE VALUES AND/OR THE SAMPLED INDUCTANCE VALUES BASED ON THE PULSE WIDTH MODULATION PERIODS

CROSS REFERENCE TO RELATED APPLICATION(S)

The present application claims the benefit of priority to U.S. Provisional Patent Application No. 60/818,321, filed Jul. 5, 2006, entitled "Sensorless Technology, Estimation of Sampled Back EMF Voltage Values and/or the Sampled Inductance Values Based on the PWM (Pulse WidthModulation) Periods," the disclosure of which is expressly incorporated herein by reference to its entirety.

TECHNICAL FIELD

The technical field of the present invention is in the area of electronics and sensorless technologies. More particularly, and without limitation, the invention relates to methods and devices for controlling a permanent magnet motor, and to methods and devices that allow for the determination of the values of the phase back EMF voltage and of the phase inductances while the phases are powered with a PWM (Pulse Width Modulation) controlled current and/or voltage.

BACKGROUND INFORMATION

To optimally control the powering of a synchronous motor (e.g., a brushless motor or a stepper motor), the rotor position has to be known. The rotor position can be obtained using, for example, a position sensor or sensorless technologies.

Sensorless technologies are based on the measurement of electrical parameter value and/or motor parameters, which vary as a function of the rotor position. For example:

the back EMF voltage which varies as a function of the speed and the rotor position; and the inductance phase value which is either constant or varies as a function of the rotor position and the phase current (saturation).

Conventional methods allow for the determination of the rotor position while simultaneously measuring the back EMF voltages of the motor phases not powered. Such solutions have the advantage of a good resolution and good low speed performances. However, these conventional methods are limited for high and mid speed ranges with high torque levels.

SUMMARY OF THE INVENTION

Embodiments of the present invention relate to methods and devices that allow for the determination of the values of the phase back EMF voltage and of the phase inductances while the phases are powered with a PWM (Pulse Width Modulation) controlled current and/or voltage. Such methods and devices may be adapted to control a permanent magnet motor, for example.

In accordance with one embodiment of the invention, a method is provided for controlling a permanent magnet motor with at least one phase, a coil, a rotor, and a power transistor stage. The method includes the steps of controlling the powering of each motor phase using a pulse width modulation (PWM) current control method initiating an OFF state of the phase power transistors on a high level current threshold and initiating an ON state of the phase power transistors on a low level current threshold; determining the time duration of the OFF and ON states of each phase for a same PWM period; determining the phase back EMF (BEMF) voltage and the phase inductance value for each phase, from the OFF and ON states time durations and from the high and low level current threshold values of each phase; determining the rotor position and/or the rotor speed from the BEMF voltage of each phase and/or the inductance value of each phase; and controlling the powering of each motor phase as a function of the rotor position and/or the rotor speed.

Consistent with another embodiment of the invention, a method is provided for controlling a permanent magnet motor with at least one phase, a coil, a rotor, and a power transistor stage. The method includes the steps of: controlling the powering of each motor phase using a PWM current control method initiating an OFF state of the phase power transistors on a high level current threshold and initiating an ON state of the phase power transistors after a time out period Toff; determining the time duration of both OFF and ON states of each phase for a same PWM period; determining the phase BEMF voltage for each phase from the OFF and ON states time durations and from the high level current threshold value of each phase; determining the rotor position and/or the rotor speed from the BEMF voltage of each phase; and controlling the powering of each motor phase as a function of the rotor position and/or the rotor speed. Such a method may be more suitable for motor with phase inductance characterized by a negligible variation of its value in function of the rotor position.

In accordance with a still further embodiment of the invention, a device is provided for controlling a permanent magnet motor with at least one phase, a coil, a rotor, and a power transistor stage. The device is adapted to: control the powering of each motor phase using a PWM current control method initiating an OFF state of the phase power transistors on a high level current threshold and initiating an ON state of the phase power transistors on a low level current threshold; determine the time duration of the OFF and ON states of each phase for a same PWM period; determine the phase BEMF voltage and the phase inductance value for each phase from the OFF and ON states time durations and from the high and low level current threshold values of each phase; determine the rotor position and/or the rotor speed from the BEMF voltage of each phase and/or the inductance value of each phase; and control the powering of each motor phase as a function of the rotor position and/or the rotor speed.

Consistent with another embodiment of the invention, a device is provided for controlling a permanent magnet motor with at least one phase, a coil, a rotor, and a power transistor stage. The device is adapted to: control the powering of each motor phase using a PWM current control method initiating an OFF state of the phase power transistors on a high level current threshold and initiating an ON state of the phase power transistors after a time out period Toff; determine the time durations of both OFF and ON states of each phase for a same PWM period; determine the phase BEMF voltage for each phase from the OFF and ON states time durations and from the high level current threshold value of each phase; determine the rotor position and/or the rotor speed from the BEMF voltages and the phase inductance values; and control the powering of each motor phase as a function of the rotor position and/or the rotor speed. Such a device may be more suitable to control a motor with a phase inductance characterized by a negligible variation of its value in function of the rotor position.

In accordance with yet another embodiment of the invention, a method is provided for controlling a permanent magnet motor with at least one phase, a coil, a rotor, and a power transistor stage. The method includes the steps of: controlling the powering of each motor phase using a PWM current control method initiating an ON state of the phase power transistors on a low level current threshold and initiating an OFF state of the phase power transistors after a time out period Ton; determining the time duration of both OFF and ON states of each phase for a same PWM period; determining the phase BEMF voltage for each phase from the OFF and ON states time durations and from the high level current threshold value of each phase; determining the rotor position and/or the rotor speed from the BEMF voltage of each phase; and controlling the powering of each motor phase as a function of the rotor position and/or the rotor speed. Such a method may be more suitable for a motor with a phase inductance characterized by a negligible variation of its value in function of the rotor position.

A further embodiment of the invention relates to a device for controlling a permanent magnet motor with at least one phase, a coil, a rotor, and a power transistor stage. The device controls the powering of each motor phase using a PWM current control method initiating an ON state of the phase power transistors on a low level current threshold and initiating an OFF state of the phase power transistors after a time out period Ton; determines the time duration of both OFF and ON states of each phase for a same PWM period; determines the phase BEMF voltage for each phase from the OFF and ON states time durations and from the high level current threshold value of each phase; determines the rotor position and/or the rotor speed from the BEMF voltages and the phase inductance values; and controls the powering of each motor phase as a function of the rotor position and/or the rotor speed. Such a device may be more suitable to control a motor with a phase inductance characterized by a negligible variation of its value in function of the rotor position.

Additional objects and advantages of the various embodiments of the invention will be set forth in part in the description, or may be learned by practice of the invention. Objects and advantages of the embodiments of the invention may be realized and attained by means of the elements and combinations particularly pointed out in the claims. Embodiments of the invention are disclosed herein and set forth in the claims.

It is understood that both the foregoing general description and the following detailed description are exemplary and explanatory only and are not restrictive of the embodiments of the invention. Further, the description of aspects, features and/or advantages of particular embodiments should not be construed as limiting other embodiments or the claims.

BRIEF DESCRIPTION OF THE DRAWINGS

The accompanying drawings, which are incorporated in and constitute a part of this specification, illustrate exemplary embodiments of the invention and, together with the description, explain the principles of the invention. In the drawings.

DETAILED DESCRIPTION OF THE EMBODIMENTS

Figure 1:
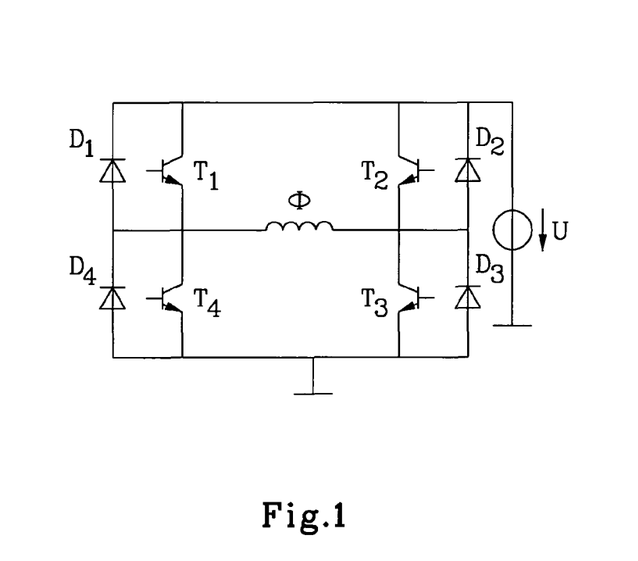
FIG. 1 illustrates an exemplary embodiment of a two phase motor, each phase being powered through a H power bridge with four transistors.

In accordance with one embodiment of the invention, for a two phase motor, each phase is powered through a H power bridge with four transistors. An example of such a motor is illustrated in the exemplary embodiment of FIG. 1.

Figure 2:
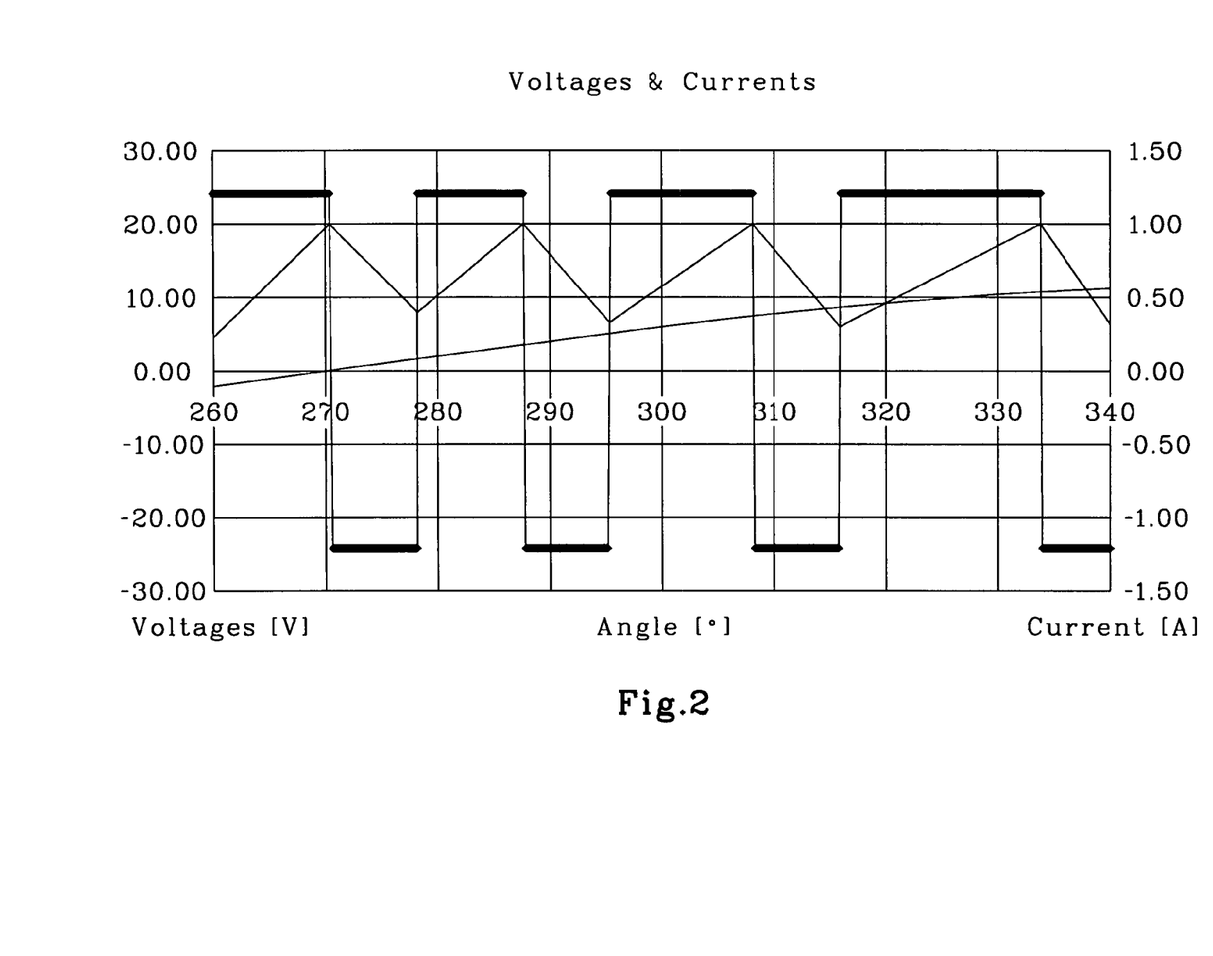
FIG. 2 illustrates an example of the phase current flowing through one motor phase (referenced by symbol φ on the schematic of FIG. 1) for a current PWM limitation to a positive value of 1 A.

FIG. 2 illustrates an example of the phase current flowing through one motor phase (referenced by symbol φ on the schematic of FIG. 1) for a current PWM limitation to a positive value of 1 A. The PWM is applied on both transistors T1 and T3 which are turned on up to the time the current reaches its target limit of 1 A (on period Ton is variable) and which are turned off during a fixed period (current decreases while circulating through diodes D4 and D2).

Figure 3:
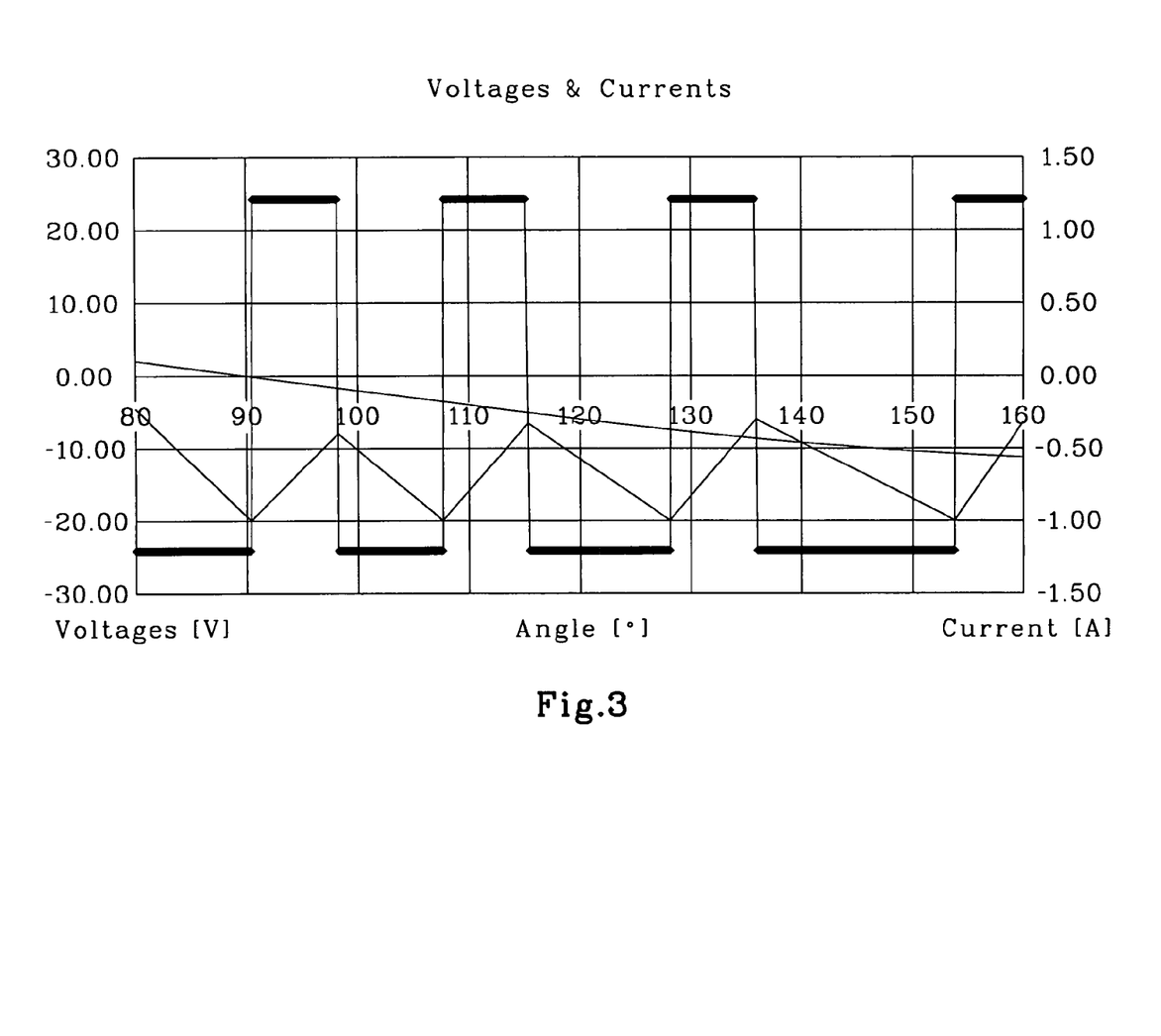
FIG. 3 illustrates an example of the phase current flowing through one motor phase (referenced by symbol φ on the schematic of FIG. 1) for a current PWM limitation to a negative value of −1 A.

FIG. 3 illustrates an example of the phase current flowing through one motor phase (referenced by symbol φ on the schematic of FIG. 1) for a current PWM limitation to a negative value of −1 A. The PWM is applied on both transistors T2 and T4 which are turned on up to the time the current reaches its target limit of −1 A (on period Ton is variable) and which are turned off during a fixed period (current decreases in absolute value while circulating through diodes D1 and D3).

Embodiments of the invention may be implemented based on a PWM period (for example, one Toff period and its following Ton period) to determine the average value of the phase inductance and the average value of the phase back EMF. For two unknown values, two equations are needed.

In accordance with one embodiment, the phase voltage equation is the following:

$$u_{applied} = R \cdot i + L \cdot \frac{di}{dt} + u_{ind}$$

Figure 4:
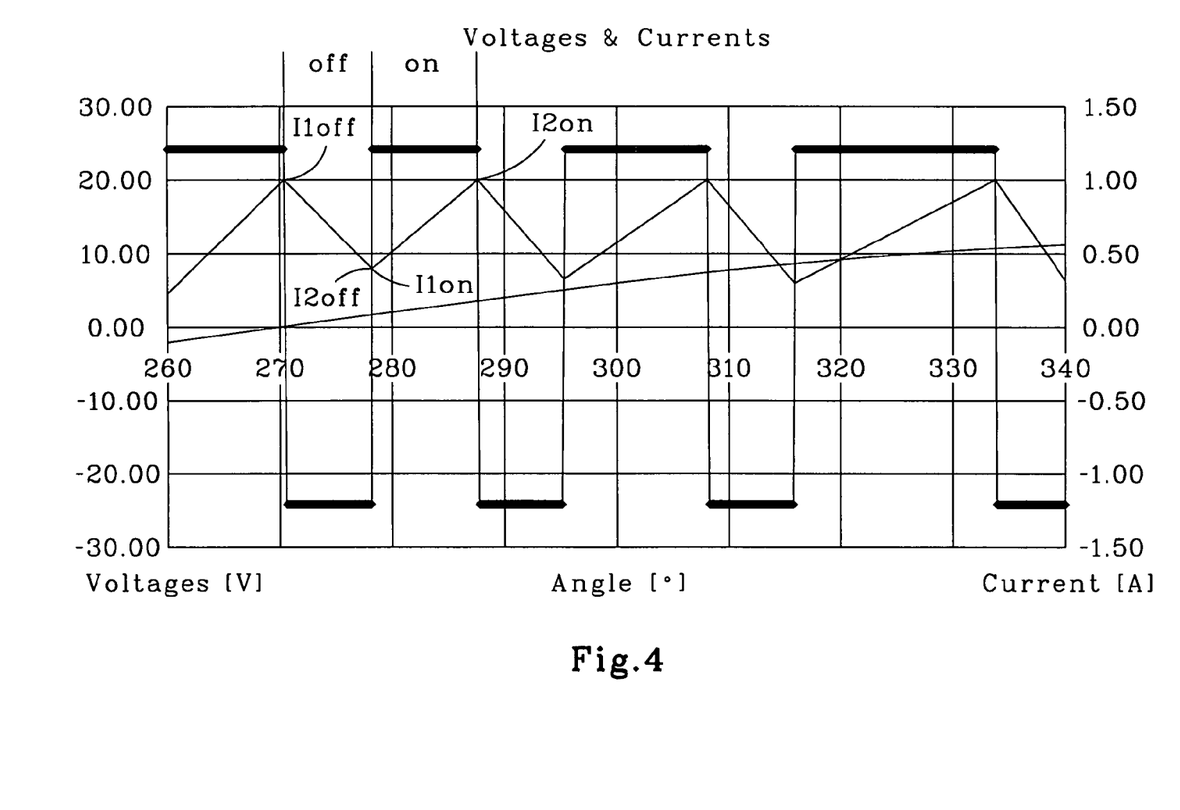
FIG. 4 illustrates an example of applying a phase voltage equation to an ON and an OFF period.

In applying this equation on the OFF period and on the ON period (an example of both considered period are illustrated in FIG. 4) and by assuming these periods are short enough to allow a linearization of the equations:

During off time Toff:

$$u_{appliedOFF} = -24 \text{ V}$$

$$i = \frac{I_{1off} + I_{2off}}{2}$$

$$di = I_{2off} - I_{1off}$$

$$dt = T_{off}$$

During on time Ton $$u_{appliedON} = 24 \text{ V}$$

$$i = \frac{I_{1on} + I_{2on}}{2}$$

$$di = I_{2on} - I_{1on}$$

$$dt = T_{on}$$

These two equations and two unknowns allow determining:

L, the average value of the phase inductance calculated on the PWM period; and uind, the average value of the phase back EMF voltage calculated on the PWM period.

Embodiments of the invention are further illustrated by the following examples. However, as will be appreciated, embodiments consistent with the invention are not limited to these examples. Indeed, many configurations (variants) are possible, depending for instance if the inductance is constant (then only one equation is necessary) or variable (two equations are necessary).

Other possible configurations (variants) are possible depending for instance on the way the PWM control is realized, for example:

Current limitation with a single compare max current limit Imax and a fixed off period Toff: I2on=I1off=Imax, Ton is variable, I1on and I2off are variables. The current PWM limitation can be applied on one or two transistors (one or two transistors turned off during the off period).

Current limitation with 2 compare current levels: I2on=I1off=Imax, I1on=I2off=Imin, Ton and Toff are variables. The current PWM limitation can be applied on one or two transistors (one or two transistors turned off during the off period).

Voltage limitation (average voltage controlled through a PWM duty cycle), the periods Ton and Toff are applied and the current levels are variables (I1off, I2off=I1on, and I2on have to be measured. The voltage PWM control can be applied on one or two transistors (one or two transistors turned off during the off period).

Four exemplary situations are considered below in illustrating embodiments consistent with the present invention.

Case 1:

L constant, PWM double with a single compare max current limit Imax and a fixed off period Toff.

Only one equation is necessary, a complete PWM period is considered:

$$u_{applied} = \frac{T_{on} \cdot 24V + T_{off} \cdot (-24\text{ V})}{T_{on} + T_{off}}$$

$$i = \frac{I_{1on} + I_{2on}}{2} = I_{max} - \frac{\Delta I}{2}$$

$$di \cong 0$$

$$dt = T_{on} + T_{off}$$

$$u_{ind} = u_{applied} - R \cdot i = 24\text{ V} \cdot \frac{T_{on} - T_{off}}{T_{on} + T_{off}} - R \cdot i$$

Case 2:

L constant, PWM on one transistor with a single compare max current limit Imax and a fixed off period Toff.

Only one equation is necessary, a complete PWM period is considered:

$$u_{applied} = \frac{T_{on} \cdot 24\text{ V} + T_{off} \cdot (0\text{ V})}{T_{on} + T_{off}}$$

$$i = \frac{I_{1on} + I_{2on}}{2} = I_{max} - \frac{\Delta I}{2}$$

$$di \cong 0$$

$$dt = T_{on} + T_{off}$$

$$u_{ind} = u_{applied} - R \cdot i = 24\text{ V} \cdot \frac{T_{on}}{T_{on} + T_{off}} - R \cdot i$$

Remarks: di=I1off−I2on=0 is assumed and has to be verified. This allows one to chose the consecutive periods ON and OFF that can be used (see FIG. 4, for example).

Case 3:

Current limitation with 2 compare current levels: I2on=I1off=Imax, I1on=I2off=Imin, Ton and Toff are variables. The current PWM limitation can be applied on two transistors (two transistors turned off during the off period):

$$I_{1on} = I_{2off} = I_{min}$$

$$I_{2on} = I_{1off} = I_{max}$$

In this example, two equations are necessary:

Equation 1 during on period Ton:

$$u_{appliedON} = U_{alim} = 24\text{ V} \quad (1)$$

$$i = \frac{I_{1on} + I_{2on}}{2} = \frac{I_{min} + I_{max}}{2}$$

$$di_{on} = I_{max} - I_{min}$$

$$dt = T_{on}$$

$$24\text{ V} = R \cdot \frac{I_{min} + I_{max}}{2} + L \cdot \frac{I_{max} - I_{min}}{T_{on}} + u_{ind}$$

Equation 2 during off period Toff:

$$u_{appliedOFF} = -U_{alim} = -24\text{ V} \quad (2)$$

$$i = \frac{I_{1off} + I_{2off}}{2}$$

$$i = \frac{I_{max} + I_{min}}{2}$$

$$di_{off} = I_{min} - I_{max} = -di_{on}$$

$$di = T_{off}$$

$$-24\text{ V} = R \cdot \frac{I_{min} + I_{max}}{2} - L \cdot \frac{I_{max} - I_{min}}{T_{off}} + u_{ind}$$

Resolution of two equations and two unknowns:

$$2 \cdot U_{alim} = L \cdot \frac{I_{max} - I_{min}}{T_{on}} + L \cdot \frac{I_{max} - I_{min}}{T_{off}} \quad (1)-(2)$$

$$2 \cdot U_{alim} = \frac{1}{T_{on}} + \frac{1}{T_{off}} \cdot (I_{max} - I_{min}) \cdot L \quad (1)-(2)$$

$$2 \cdot U_{alim} = \frac{T_{on} + T_{off}}{T_{off} \cdot T_{on}} \cdot (I_{max} - I_{min}) \cdot L \quad (1)-(2)$$

$$L = 2 \cdot \frac{U_{alim}}{(I_{max} - I_{min})} \frac{T_{on} \cdot T_{off}}{T_{off} + T_{on}} \quad (1)-(2) \rightarrow (3)$$

$$24\text{ V} = R \cdot \frac{I_{min} + I_{max}}{2} + \quad (3)\text{in}(1)$$

$$2 \cdot \frac{U_{alim}}{(I_{max} - I_{min})} \frac{T_{on} \cdot T_{off}}{T_{off} + T_{on}} \cdot \frac{I_{max} - I_{min}}{T_{on}} + u_{ind}$$

-continued $$U_{alim} = R \cdot \frac{I_{min} + I_{max}}{2} + 2 \cdot U_{alim} \frac{T_{off}}{T_{off} + T_{on}} + u_{ind} \quad (3)in(1)$$

$$u_{ind} = U_{alim}\left(1 - 2 \cdot \frac{T_{off}}{T_{off} + T_{on}}\right) - R \cdot \frac{I_{min} + I_{max}}{2}$$

$$= U_{alim}\left(\frac{T_{off} + T_{on} - 2T_{off}}{T_{off} + T_{on}}\right) - R \cdot \frac{I_{min} + I_{max}}{2}$$

$$u_{ind} = U_{alim}\left(\frac{T_{on} - T_{off}}{T_{on} + T_{off}}\right) - R \cdot \frac{I_{min} + I_{max}}{2}$$

Case 4:

Current limitation with two compare current levels: I2on=I1off=Imax, I1on=I2off=Imin, Ton and Toff are variables. The current PWM limitation can be applied on one transistor (one transistor turned off during the off period):

$$I_{1on} = I_{2off} = I_{min}$$

$$I_{2on} = I_{1off} = I_{max}$$

In this example, two equations are necessary:

Equation 1 during on period Ton $$u_{appliedON} = U_{alim} = 24 \text{ V} \quad (1)$$

$$i = \frac{I_{1on} + I_{2on}}{2} = \frac{I_{min} + I_{max}}{2}$$

$$di_{on} = I_{max} - I_{min}$$

$$dt = T_{on}$$

$$24 \text{ V} = R \cdot \frac{I_{min} + I_{max}}{2} + L \cdot \frac{I_{max} - I_{min}}{T_{on}} + u_{ind}$$

Equation 2 during off period Toff:

$$u_{appliedOFF} = 0 \quad (2)$$

$$i = \frac{I_{1off} + I_{2off}}{2}$$

$$i = \frac{I_{max} + I_{min}}{2}$$

$$di_{off} = I_{min} - I_{max} = -di_{on}$$

$$dt = T_{off}$$

$$0 = R \cdot \frac{I_{min} + I_{max}}{2} - L \cdot \frac{I_{max} - I_{min}}{T_{off}} + u_{ind}$$

Resolution of two equations with two unknowns:

$$U_{alim} = L \cdot \frac{I_{max} - I_{min}}{T_{on}} + L \cdot \frac{I_{max} - I_{min}}{T_{off}} \quad (1)-(2)$$

$$U_{alim} = \frac{1}{T_{on}} + \frac{1}{T_{off}} \cdot (I_{max} - I_{min}) \cdot L \quad (1)-(2)$$

$$U_{alim} = \frac{T_{on} + T_{off}}{T_{off} \cdot T_{on}} \cdot (I_{max} - I_{min}) \cdot L \quad (1)-(2)$$

$$L = \frac{U_{alim}}{(I_{max} - I_{min})} \frac{T_{on} \cdot T_{off}}{T_{off} + T_{on}} \quad (1)-(2) \rightarrow (3)$$

$$24 \text{ V} = \quad (3)in(1)$$
$$R \cdot \frac{I_{min} + I_{max}}{2} \frac{U_{alim}}{(I_{max} - I_{min})} \frac{T_{on} \cdot T_{off}}{T_{off} + T_{on}} \cdot \frac{I_{max} - I_{min}}{T_{on}} + u_{ind}$$

$$U_{alim} = R \cdot \frac{I_{min} + I_{max}}{2} + 2 \cdot U_{alim} \frac{T_{off}}{T_{off} + T_{on}} + u_{ind} \quad (3)in(1)$$

$$u_{ind} = U_{alim}\left(1 - \frac{T_{off}}{T_{off} + T_{on}}\right) - R \cdot \frac{I_{min} + I_{max}}{2}$$

$$= U_{alim}\left(\frac{T_{off} + T_{on} - 2T_{off}}{T_{off} + T_{on}}\right) - R \cdot \frac{I_{min} + I_{max}}{2}$$

$$u_{ind} = U_{alim}\left(\frac{T_{on} - T_{off}}{T_{on} + T_{off}}\right) - R \cdot \frac{I_{min} + I_{max}}{2}$$

Realization Example

Figure 5A:
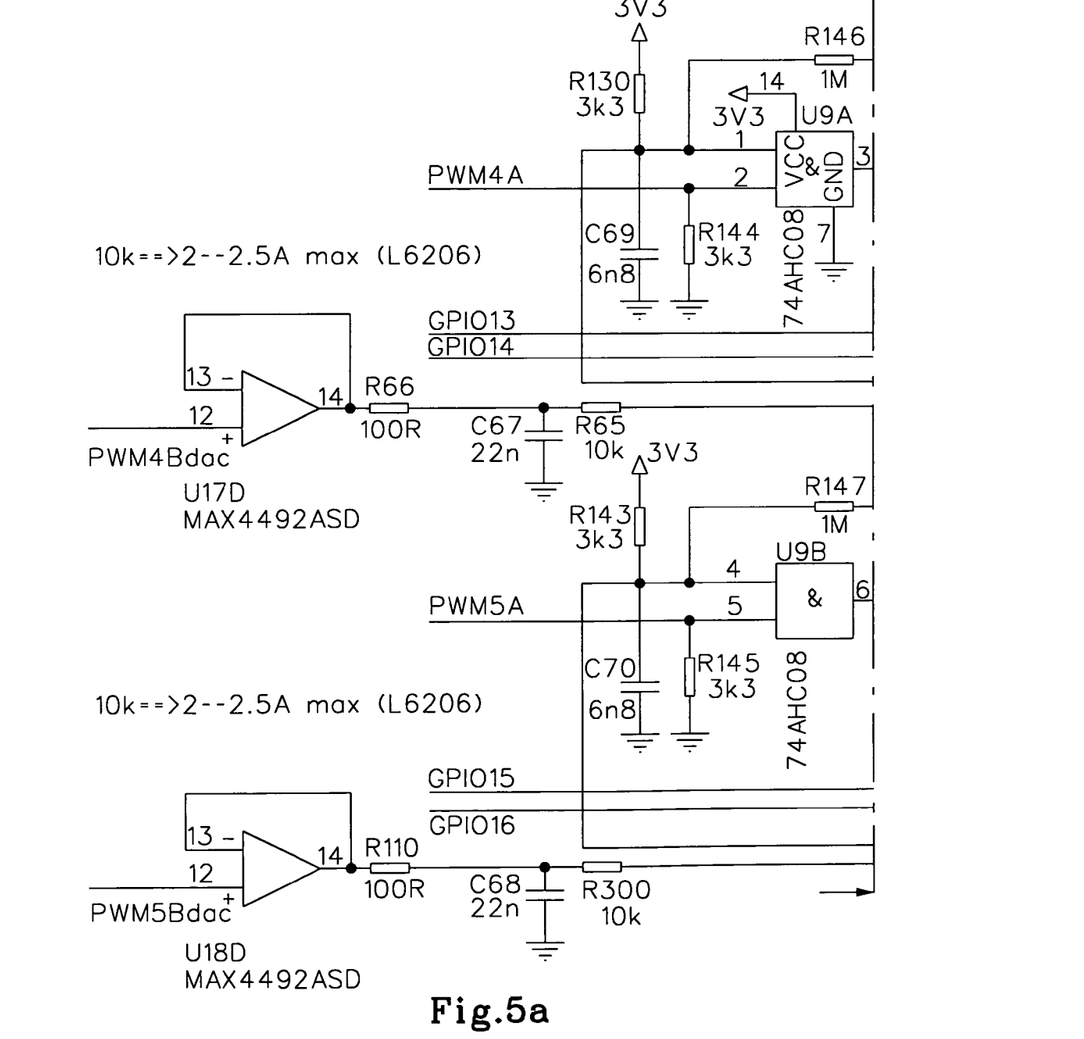
FIG. 5 illustrates an exemplary embodiment of a circuit that is implemented as a double H power bridge.
Figure 5B:
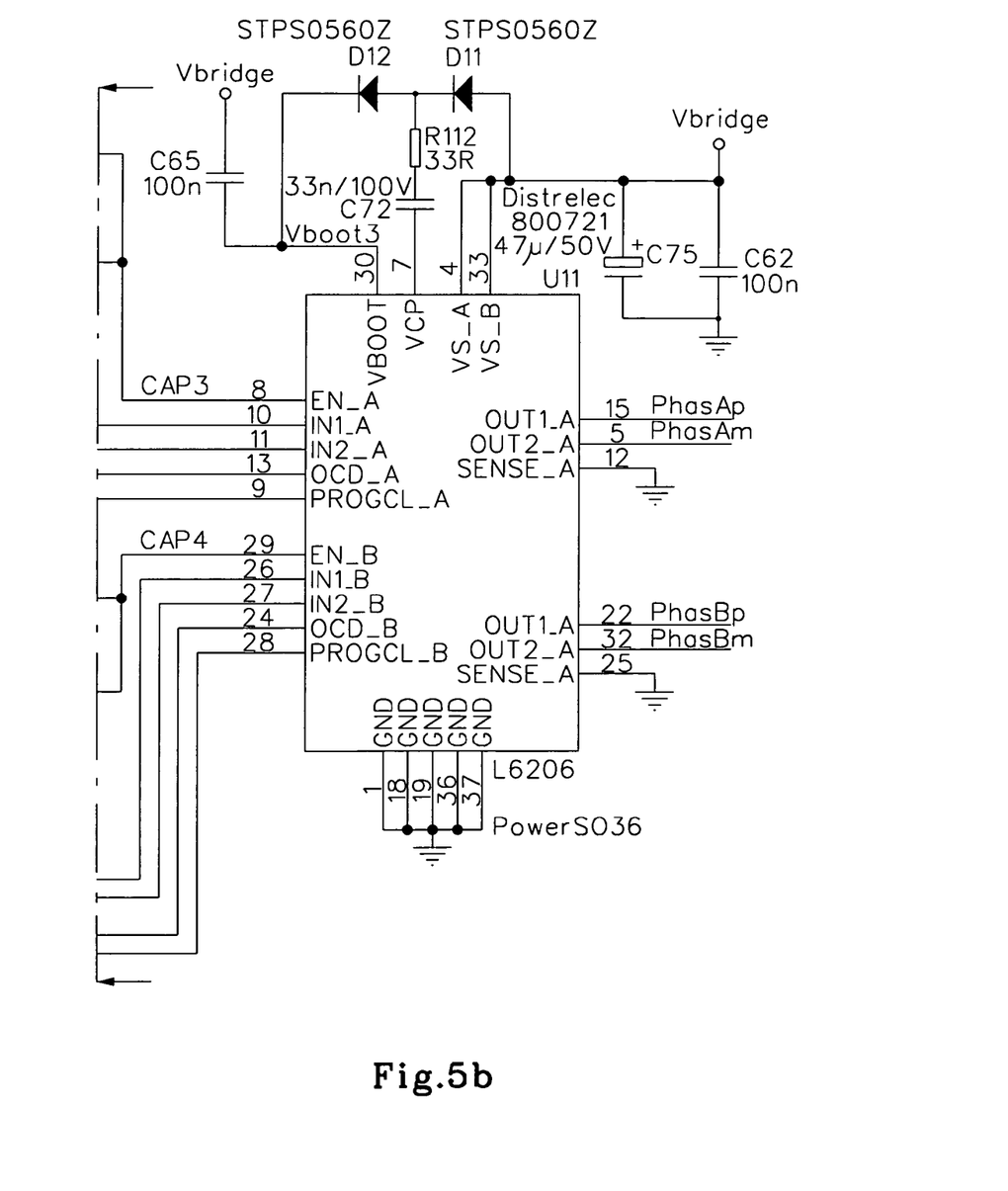

Consistent with an embodiment of the present invention, the circuit U11 may be implemented as a double H power bridge (see, e.g., FIG. 5) allowing to power, for example, the two phases A & B of a stepper motor:

Motor phase A is connected to Phase Ap (connection+) and phase Am (connection−). The value of the target current limit is given by the signal PWM4Bdac filtered by the RC filter R66 et C67. The signal CAP3 gives a logic level signal allowing to measure the duration of the on and off periods Ton and Toff for phase A.

Motor phase B is connected to Phase Bp (connection+) and phase Bm (connection−). The value of the target current limit is given by the signal PWM5Bdac filtered by the RC filter R110 et C68. The signal CAP4 gives a logic level signal allowing to measure the duration of the on and off periods Ton and Toff for phase B.

Figure 6:
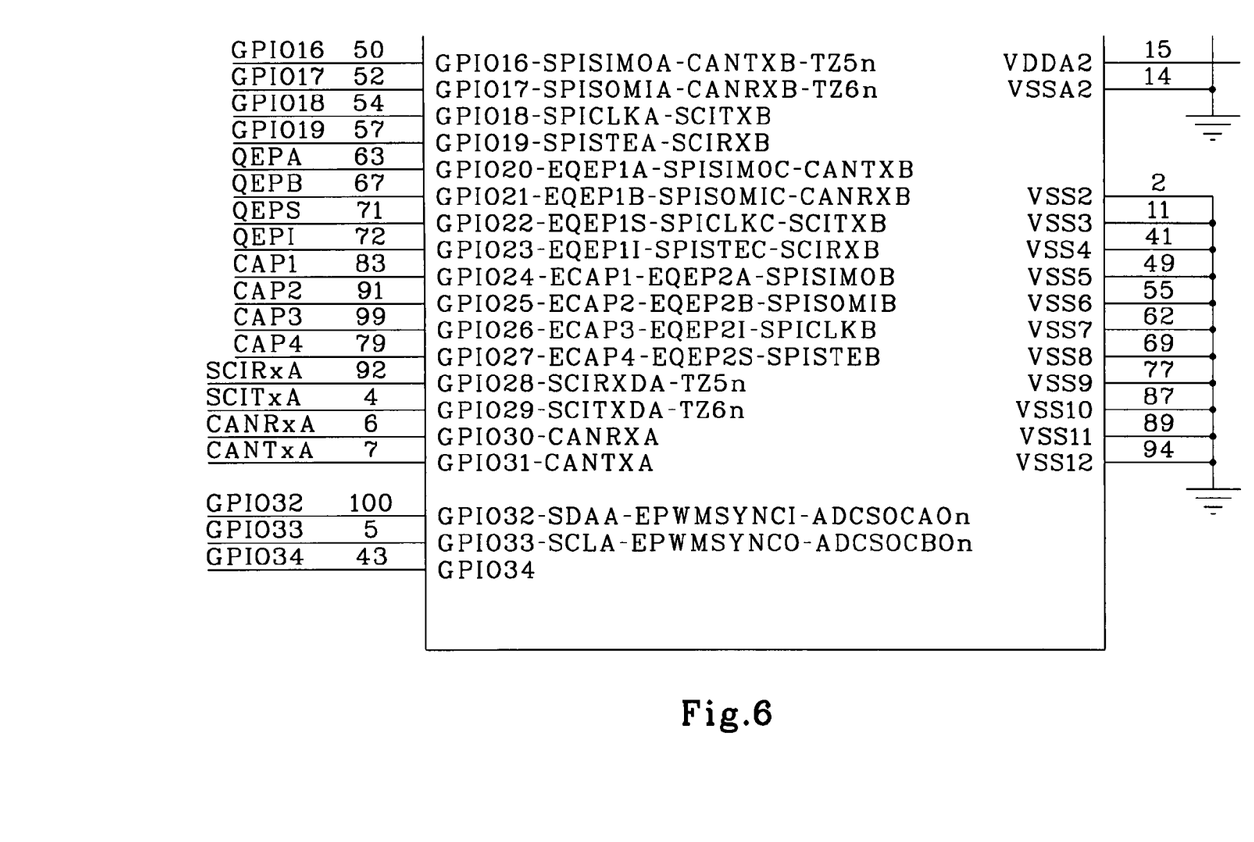
FIG. 6 illustrates an exemplary schematic representation, including signals CAP3 et CAP4 that are connected to capture inputs of a DSP TMS320F2808PZ.

As shown in FIG. 6, the signals CAP3 et CAP4 are connected to capture inputs of the DSP TMS320F2808PZ (CAP3 on ECCAP3 pin 99, CAP4 on ECCAP4 pin 79). Each capture input allow to memorize a counter value (which counter is continuously counting up) on a given positive or/and negative edge, which means to measure the on and off periods Ton and Toff.

The current PWM limitation may be applied on two transistors (two transistors turned off during the OFF period) with a single compare max current limit (+/−Imax) and a fixed off period Toff: I2on=I1off=Imax, Ton is variable, I1on=I2off is variable.

Figure 7:
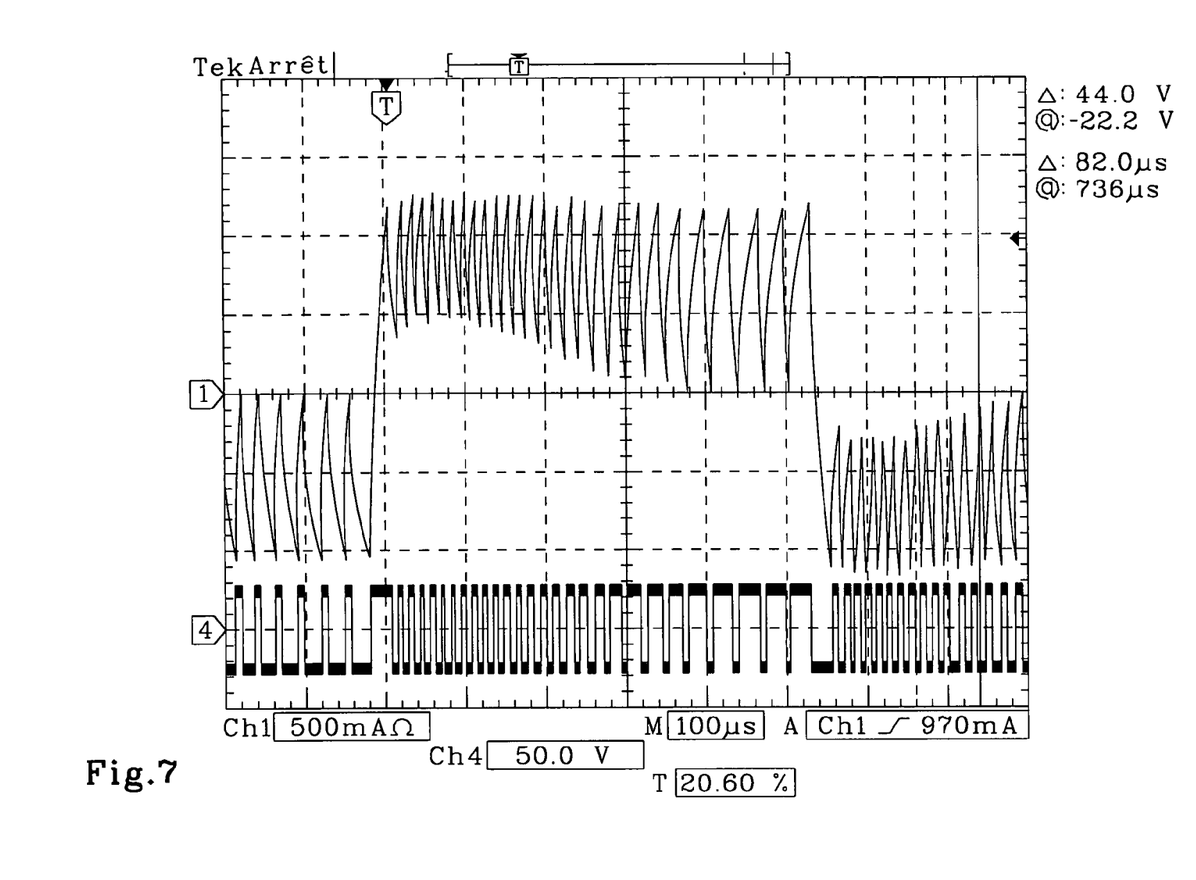
FIG. 7, consistent with an exemplary embodiment, illustrates a one phase current in a two phase stepper motor.

FIG. 7, consistent with an exemplary embodiment, illustrates a one phase current in a two phase stepper motor (e.g., type Sanyo Denki XSH5210-149, 200 steps per turn) rotating at 4000 steps per second.

Trace 1 gives the phase current limited at +/−2.4 A with a constant off time. Trace 4 gives the voltage applied on the measured motor phase, which voltage value being 24V or −24V during the on and off periods Ton and Toff. Trace 1: phase current [A]. Trace 4: applied phase voltage [V].

The signals CAP3 et CAP4 connected to the capture input of the DSP TMS320F2808PZ (CAP3 on ECCAP3 pin 99, CAP4 on ECCAP4 pin 79) are the logic state of the applied phase voltage:

During the current positive modulation (current limited to +Imax), the logic state of signal CAPx is 1 during the on period Ton (active high) (applied voltage is 24V); the logic state of signal CAPx is 0 during the off period Toff (applied voltage is −24V).

During the current negative modulation (current limited to −Imax), the logic state of signal CAPx is 1 during the on period Ton (active high) (applied voltage is −24V); the logic state of signal CAPx is 0 during the off period Toff (applied voltage is 24V).

Consistent with embodiments of the invention, an algorithm programmed in the DSP may be provided to allow the measurement of the duration of the periods ON and OFF of the logic signal CAP3 (phase A) and the duration of the periods ON and OFF of the logic signal CAP4 (phase B).

Figure 8:
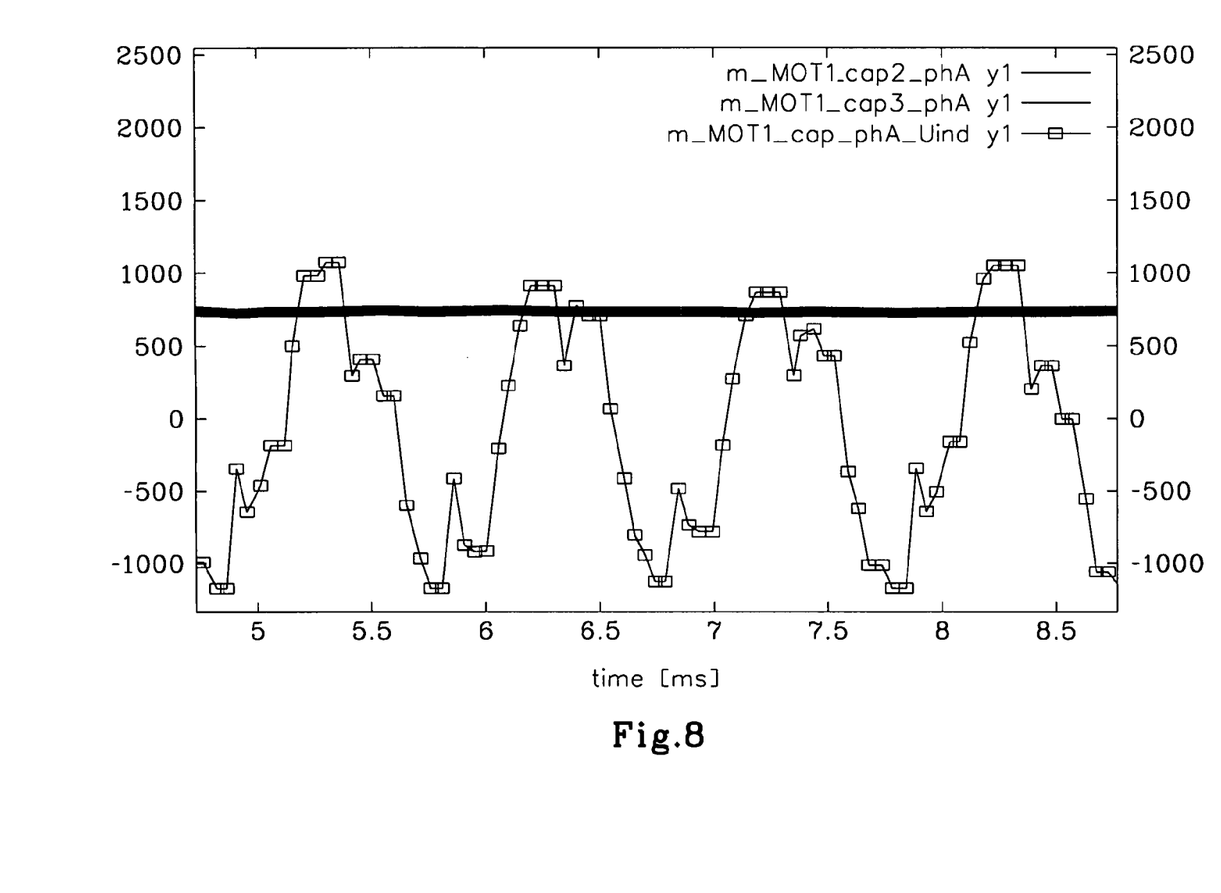
FIG. 8 shows, in accordance with one embodiment, a measured example for a stepper motor rotating at 4000 step per second.

FIG. 8 shows a measured example for a stepper motor rotating at 4000 step per second:

m_MOT1_cap2_phA=Toff duration of signal CAP3, 10 ns per unit.

m_MOT1_cap3_phA=Ton duration of signal CAP3, 10 ns per unit.

m_MOT1_cap_phA_Uind=determined back EMF value based on the measured Ton & Toff [cV].

The determined back EMF value based on the measured Ton & Toff (see, e.g., trace m_MOT1_cap_phA_Uind in FIG. 8) shows a sinusoidal back EMF. The determined back EMF is however perturbed at each transition from the positive current modulation to negative one and at each transition from the negative current modulation to positive one (such sampled value shall not be considered). The sample rate of the determined back EMF corresponds to the PWM frequency (which varies in this example from 50 kHz to 25 kHz).

For this example, the motor phase inductance may be considered as constant and the average value of the phase back EMF can be determined using one of the following two equations:

$$u_{ind} = u_{applied} - R \cdot i = 24 \text{ V} \cdot \frac{T_{on} - T_{off}}{T_{on} + T_{off}} - R \cdot \left(I_{max} - \frac{\Delta I}{2}\right)$$

for the positive current modulation, and $$u_{ind} = u_{applied} - R \cdot i = -24 \text{ V} \cdot \frac{T_{on} - T_{off}}{T_{on} + T_{off}} + R \cdot \left(I_{max} - \frac{\Delta I}{2}\right)$$

for the negative current modulation.

As shown above, embodiments of the present invention may enable the determination of the back EMF waveform while the motor is rotating and both phases are powered with a negative and/or positive current. From these determined phase back EMF voltages, it is then possible to determine the rotor position and the motor speed.

By way of example, assume the two phase motor has two phase back EMF shifted by 90° electrical degrees, so a four quadrant arc tangent function of the two phase back EMF ratio allows the rotor position on one electrical period to be determined as follows:

$$\text{rotor\_position} = \text{Arctg}\left(\frac{u_{indA}}{u_{indB}}\right) + \text{offset}$$

The determined rotor position and rotor speed allows then:
to control the powering of the motor phases in closed loop (which allows a control of the torque);
to control the motor speed in closed loop; and/or
to control the rotor position in closed loop.

The examples described above are only representative of the numerous examples that can be used in accordance with the principles of the invention. Of course, embodiments of the invention are not limited to the exemplary embodiments described above and variations and improvements may be made, without departing from the scope of the present invention. By way of example, although embodiments of the invention have been described with reference to a two phase stepper motor (which can be considered as a two phase permanent magnet synchronous motor), it will be appreciated by those skilled in the art that the features of the invention may also be applied to multi-phase rotating motors (m phase motor, m=1, 2,3,4,5 . . . ), as well as linear motors. Further, although the invention has been described with reference to a 2 phase motor with each phase being powered through a H power bridge with four transistors, it will be understood that embodiments of the invention may also be applied to a 3 phase motor supplied with a six transistors power bridge. Further, although the invention has been described with reference to a synchronous motor, it will be understood that embodiments of the invention may also be applied to asynchronous motors.

Embodiments of the present invention may provide or exhibit one or more of the following advantages:

The rotor position can be determined with the motor phases supplied with the plain current (full torque is available).

The invention as applied to variants, where time period(s) are measured, may allow a good resolution without AD converter.

The invention as applied to variants, where PWM time periods (Ton and Toff) are applied and "initial & end on & off" current levels are measured (I1off I2off=I1on and I2on), may allow one to get the same result but with more complex hardware.

While certain methods and devices consistent with the present invention have been presented herein for purposes of illustration, It will be apparent to those skilled in the art that the features of the invention may be implemented in hardware, software, firmware, and/or any suitable combination(s) thereof.

It is intended, therefore, that the specification and examples be considered as exemplary only, with a true scope and spirit of the invention being indicated by the following claims.

What is claimed is:

1. A method for controlling a permanent magnet motor with at least one phase, a coil, a rotor, and a power transistor stage, the method comprising the steps of:
controlling the powering of each motor phase using a pulse width modulation (PWM) current control method initiating an OFF state of the phase power transistors on a high level current threshold and initiating an ON state of the phase power transistors on a low level current threshold;
determining for at least one phase, i) the time duration of the OFF state of a PWM period and ii) the time duration of the ON state for the same PWM period;
calculating at least one of i) the phase back EMF (BEMF) voltage and ii) the phase inductance value for the at least one phase from the determined time durations of the OFF and ON states time durations and from the high and low level current threshold values of the at least one phase;
determining at least one of i) the rotor position and ii) the rotor speed from at least one of i) the calculated BEMF voltage of the at least one phase and ii) the inductance value of the at least one phase; and
controlling the powering of each motor phase as a function of at least one of i) the rotor position and ii) the rotor speed, wherein said calculating of at least one of i) the phase back EMF (BEMF) voltage and ii) the phase inductance value for the at least one phase is calculated by a mathematical formula depending on the four parameters including i) determined time duration of the OFF state of the at least one phase, ii) determined time duration of the ON state of the at least one phase, iii) high level current threshold of the at least one phase, and iv) low level threshold values of the at least one phase.

2. A method according to claim 1, wherein the coil is powered in a unidirectional manner.

3. A method according to claim 1, wherein the coil is powered in a bi-directional manner.

4. A method according to claim 1, wherein the OFF state is applied on one of two power transistors supplying the at least one phase.

5. A method according to claim 1, wherein the OFF state is applied on both of two power transistors supplying the at least one phase.

6. A method according to claim 1, wherein the PWM period is maintained below 66 microseconds by adapting the gap between the low and high levels current threshold to maintain the PWM resulting frequency higher than 15 kHz in order to stay outside the audible range.

7. A method according to claim 1, wherein the powering of the motor is switched as a function of the number of the motor phases, the phase powering type, the motor type, and the operating mode thereof.

8. A method for controlling a permanent magnet motor with at least one phase, a coil, a rotor, and a power transistor stage, the method comprising the steps of:
controlling the powering of each motor phase using a pulse width modulation (PWM) current control method initiating an OFF state of the phase power transistors on a high level current threshold and initiating an ON state of the phase power transistors after a time out period Toff,
determining for at least one phase the time duration of the OFF state of a PWM period and the time duration of the ON state for the same PWM period;
calculating the phase BEMF voltage for the at least one phase from the determined time durations of the OFF and ON states and from the high level current threshold value of the at least one phase;
determining at least one of i) the rotor position and ii) the rotor speed from the BEMF voltage of the at least one phase; and
controlling the powering of each motor phase as a function of at least one of i) the rotor position and ii) the rotor speed.

9. A method according to claim 8, wherein the coil is powered in a unidirectional manner.

10. A method according to claim 8, wherein the coil is powered in a bi-directional manner.

11. A method according to claim 8, wherein the OFF state is applied on one of two power transistors supplying the at least one phase.

12. A method according to claim 8, wherein the OFF state is applied on both of two power transistors supplying the at least one phase.

13. A method according to claim 8, wherein the PWM period is maintained below 66 microseconds by adapting the OFF state time out period Toff to maintain the PWM resulting frequency higher than 15 kHz in order to stay outside the audible range.

14. A method according to claim 8, wherein the powering of the motor is switched as a function of the number of the motor phases, the phase powering type, the motor type, and the operating mode thereof.

15. A device for controlling a permanent magnet motor with at least one phase, a coil, a rotor, and a power transistor stage, wherein the device:
(a) controls the powering of each motor phase using a pulse width modulation (PWM) current control method initiating an OFF state of the phase power transistors on a high level current threshold and initiating an ON state of the phase power transistors on a low level current threshold;
(b) determines for at least one phase the time duration of the OFF state of a PWM period and the time duration of the ON state for the same PWM period;
(c) calculates at least one of i) the phase BEMF voltage and ii) the phase inductance value for the at least one phase from the determined time durations of the OFF and ON states and from the high and low level current threshold values of the at least one phase;
(d) determines at least one of i) the rotor position and ii) the rotor speed from at least one of i) the BEMF voltage of the at least one phase and ii) the inductance value of the at least one phase; and
(e) controls the powering of each motor phase as a function of at least one of i) the rotor position and ii) the rotor speed.

16. A device according to claim 15, wherein the coil is powered in a unidirectional manner.

17. A device according to claim 15, wherein the coil is powered in a bi-directional manner.

18. A device according to claim 15, wherein the OFF state is applied on one of two power transistors supplying the at least one phase.

19. A device according to claim 15, wherein the OFF state is applied on both of two power transistors supplying the at least one phase.

20. A device according to claim 15, wherein the PWM period is maintained below 66 microseconds by adapting the gap between the low and high levels current threshold to maintain the PWM resulting frequency higher than 15 kHz in order to stay outside the audible range.

21. A device according to claim 15, wherein the powering of the motor is switched as a function of the number of the motor phases, the phase powering type, the motor type, and the operating mode thereof.

22. A device for controlling a permanent magnet motor with at least one phase, a coil, a rotor, and a power transistor stage, wherein the device:
(a) controls the powering of each motor phase using a pulse width modulation (PWM) current control method initiating an OFF state of the phase power transistors on a high level current threshold and initiating an ON state of the phase power transistors after a time out period Toff;
(b) determines for the at least one phase the time duration of the OFF state of a PWM period and the time duration of the ON state for the same PWM period;
(c) calculates the phase BEMF voltage for the at least one phase from the determined time durations of the OFF and ON states and from the high level current threshold value of the at least one phase;
(d) determines at least one of i) the rotor position and ii) the rotor speed from the BEMF voltages and the phase inductance values; and (e) controls the powering of each motor phase as a function of at least one of i) the rotor position and ii) the rotor speed.

23. A device according to claim 22, wherein the coil is powered in a unidirectional manner.

24. A device according to claim 22, wherein the coil is powered in a bi-directional manner.

25. A device according to claim 22, wherein the OFF state is applied on one of two power transistors supplying the at least one phase.

26. A device according to claim 22, wherein the OFF state is applied on both of two power transistors supplying the at least one phase.

27. A device according to claim 22, wherein the PWM period is maintained below 66 microseconds by adapting the OFF state time out period Toff to maintain the PWM resulting frequency higher than 15 kHz in order to stay outside the audible range.

28. A device according to claim 22, wherein the powering of the motor is switched as a function of the number of the motor phases, the phase powering type, the motor type, and the operating mode thereof.

29. A method for controlling a permanent magnet motor with at least one phase, a coil, a rotor, and a power transistor stage, the method comprising the steps of:
controlling the powering of each motor phase using a pulse width modulation (PWM) current control method initiating an ON state of the phase power transistors on a low level current threshold and initiating an OFF state of the phase power transistors after a time out period Ton;
determining for at least one phase the time duration of the OFF state of a PWM period and the time duration of the ON state for the same PWM period;
calculating the phase BEMF voltage for the at least one phase from the determined time durations of the OFF and ON states and from the high level current threshold value of the at least one phase;
determining at least one of i) the rotor position and ii) the rotor speed from the BEMF voltage of the at least one phase; and
controlling the powering of each motor phase as a function of at least one of i) the rotor position and ii) the rotor speed.

30. A method according to claim 29, wherein the coil is powered in a unidirectional manner.

31. A method according to claim 29, wherein the coil is powered in a bi-directional manner.

32. A method according to claim 29, wherein the OFF state is applied on one of two power transistors supplying the at least one phase.

33. A method according to claim 29, wherein the OFF state is applied on both of two power transistors supplying the at least one phase.

34. A method according to claim 29, wherein the PWM period is maintained below 66 microseconds by adapting the ON state time out period Ton to maintain the PWM resulting frequency higher than 15 kHz in order to stay outside the audible range.

35. A method according to claim 29, wherein the powering of the motor is switched as a function of the number of the motor phases, the phase powering type, the motor type, and the operating mode thereof.

36. A device for controlling a permanent magnet motor with at least one phase, a coil, a rotor, and a power transistor stage, wherein the device:

(a) controls the powering of each motor phase using a pulse width modulation (PWM) current control method initiating an ON state of the phase power transistors on a low level current threshold and initiating an OFF state of the phase power transistors after a time out period Ton;
(b) determines for at least one phase the time duration of the OFF state of a PWM period and the time duration of the ON state for the same PWM period;
(c) calculates the phase BEMF voltage for the at least one phase from the determined time durations of the OFF and ON states and from the high level current threshold value of the at least one phase;
(d) determines at least one of i) the rotor position and ii) the rotor speed from the BEMF voltages and the phase inductance values; and
(e) controls the powering of each motor phase as a function of at least one of i) the rotor position and ii) the rotor speed.

37. A device according to claim 36, wherein the coil is powered in a unidirectional manner.

38. A device according to claim 36, wherein the coil is powered in a bi-directional manner.

39. A device according to claim 36, wherein the OFF state is applied on one of two power transistors supplying the at least one phase.

40. A device according to claim 36, wherein the OFF state is applied on both of two power transistors supplying the at least one phase.

41. A device according to claim 36, wherein the PWM period is maintained below 66 microseconds by adapting the ON state time out period Ton to maintain the PWM resulting frequency higher than 15 kHz in order to stay outside the audible range.

42. A device according to claim 36, wherein the powering of the motor is switched as a function of the number of the motor phases, the phase powering type, the motor type, and the operating mode thereof.

43. A method for controlling a permanent magnet motor with at least two phases, a coil, a rotor, and a power transistor stage, the method comprising the steps of:
controlling the powering of each motor phase using a pulse width modulation (PWM) current control method initiating an OFF state of the phase power transistors on a high level current threshold and initiating an ON state of the phase power transistors on a low level current threshold;
determining for at least one phase the time duration of the OFF state of a PWM period and the time duration of the ON state for the same PWM period;
calculating at least one of i) the phase back EMF (BEMF) voltage and ii) the phase inductance value for the at least one phase from the determined time durations of the OFF and ON states and from the high and low level current threshold values of the at least one phase;
determining at least one of i) the rotor position and ii) the rotor speed from the calculated BEMF voltage of the at least one phase and/or the inductance value of the at least one phase; and
controlling the powering of each motor phase as a function of at least one of i) the rotor position and ii) the rotor speed.

* * * * *

UNITED STATES PATENT AND TRADEMARK OFFICE
CERTIFICATE OF CORRECTION

PATENT NO.        : 8,531,145 B2
APPLICATION NO.   : 12/307308
DATED             : September 10, 2013
INVENTOR(S)       : Cardoletti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1079 days.

Signed and Sealed this
Fifteenth Day of September, 2015

Michelle K. Lee
*Director of the United States Patent and Trademark Office*